C. B. KEENUM.
VEHICLE RIM.
APPLICATION FILED FEB. 2, 1920.
1,389,649.
Patented Sept. 6, 1921.
2 SHEETS—SHEET 1.
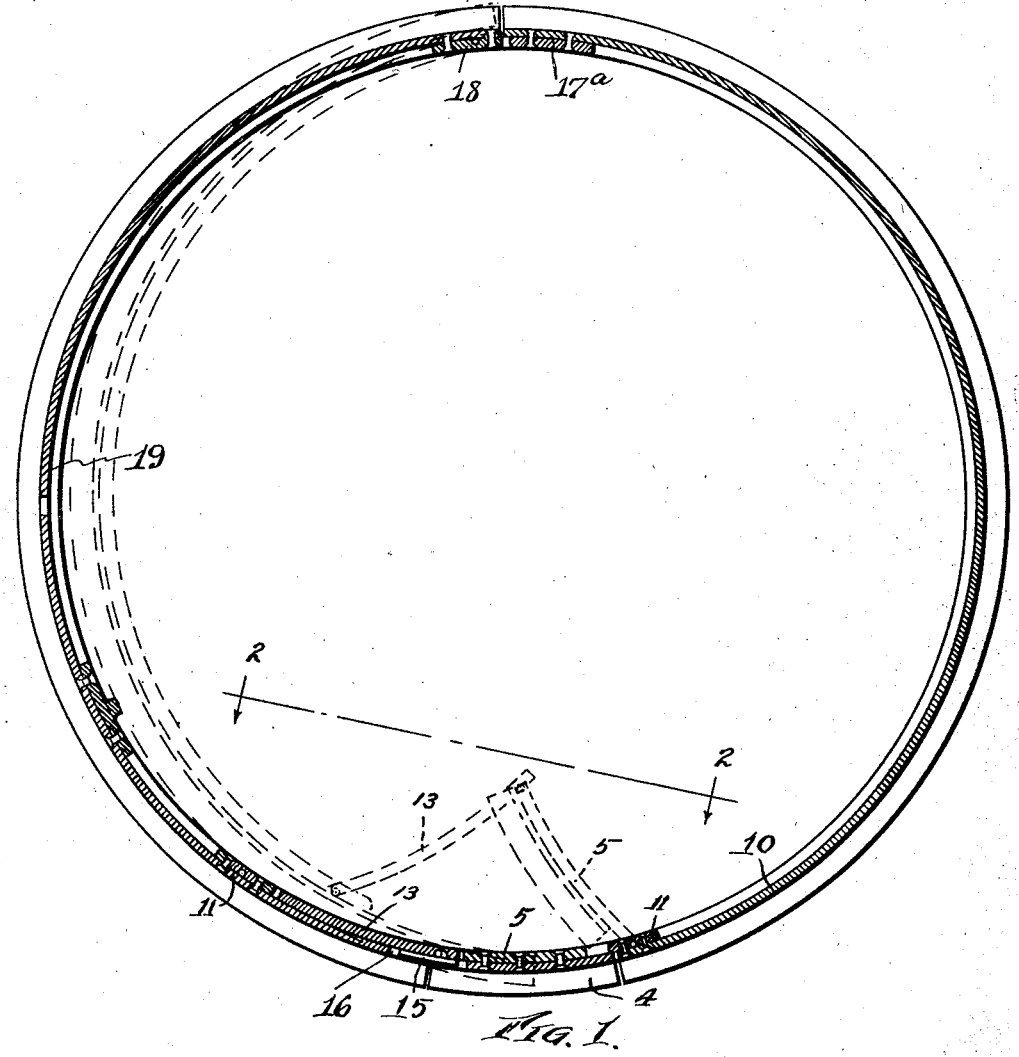
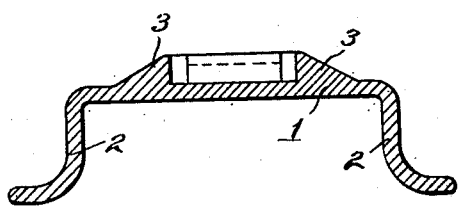
INVENTOR,
Charles B. Keenum
By Brockett & Hyde
Attys.

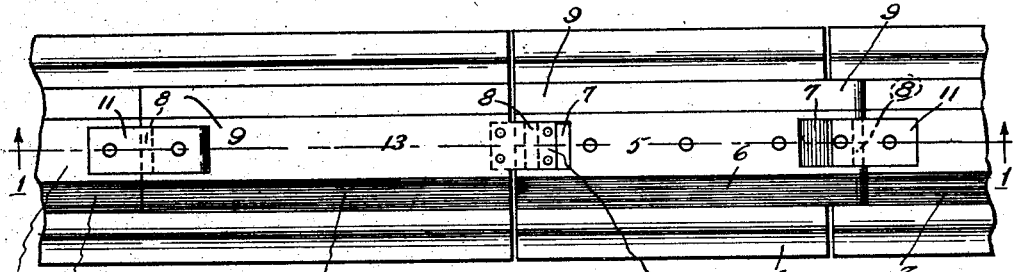

UNITED STATES PATENT OFFICE.

CHARLES B. KEENUM, OF CLEVELAND, OHIO.

VEHICLE-RIM.

1,389,649.         Specification of Letters Patent.     Patented Sept. 6, 1921.

Application filed February 2, 1920. Serial No. 355,615.

*To all whom it may concern:*

Be it known that I, CHARLES B. KEENUM, a citizen of the United States, residing at Cleveland, in the county of Cuyahoga and State of Ohio, have invented certain new and useful Improvements in Vehicle-Rims, of which the following is a specification.

This invention relates to vehicle rims of the collapsible type and is an improvement upon the rim of my prior application, Serial No. 278,604, filed Feb. 24, 1919.

The object of the present invention is to improve the general construction and arrangement of the hinge members and other operating parts so as to simplify the rim and provide a flat or shallow form of mechanism on the inside of the rim that will readily go on the wheel felly. Another object is to provide abutting relation between the end portion of the hinge and connecting plates and of said plates with the rim members to more solidly resist compressing strains on the rim.

Further objects of the invention are in part obvious and in part will appear more in detail hereinafter.

The invention comprises the construction and arrangement of parts hereinafter described and claimed.

In the drawings which represent one suitable embodiment of the invention, Figure 1 is a central sectional elevation on the line 1—1, Fig. 2; Fig. 2 is a plan view of the rim joint viewed in the direction of the arrows 2—2, Fig. 1; Fig. 3 is a side elevation of the rim joint; Figs. 4, 5, 6 and 7 are cross sectional views on the lines 4—4, 5—5, 6—6, and 7—7, Fig. 3; Fig. 8 is a side elevation showing the rim collapsed; Fig. 9 is a detail perspective view of one end portion of a plate; and Fig. 10 is a similar view of a block.

The rim shown in the drawings is an annulus of channel form in cross section, as shown in Fig. 7, being provided with a tire seat or rim base 1 and two opposite flanges or walls 2. On its inner face said rim is provided with the usual beveled ribs 3 one of which seats on the wheel felly and the other of which receives the usual wedging ring (not shown).

One portion of the rim annulus, in the form of a relatively short collapsing segment 4, is separate from the remainder of the annulus and is the portion which is removed or taken out from the annulus to shorten the same and permit it to collapse or be collapsed and thereby removed from the tire. This member 4 has the ribs 3 omitted therefrom and on its inner face is provided with a hinge plate 5, riveted or otherwise secured thereto, whose side edges are beveled, as at 6, in continuation of the beveled faces of ribs 3. Plate 5 at each end is notched or recessed, as at 7, but a small metal bridge or cross piece 8 is left connecting the arms 9 on either side of said recesses, said bridge or cross pieces forming hinge pins, as will later appear.

At one end of said plate 5 the arms 9 extend beyond its end and overlie a portion of the adjoining rim member 10 where they abut the ends of the ribs 3. Between said ribs member 10 is provided with a block 11 having a recess or opening 12 to receive the hinge pin 8. This block is laid in place over the hinge pin and while held in proper position is riveted or spot-welded in place to secure the parts permanently in position. This arrangement provides a hinge connection between the plate 5 with the rim segment 4 carried thereby and the rim segment 10, permitting the parts to be moved to either the full line or dotted line position, Fig. 1.

At its other end plate 5 is connected to a toggle bar 13 similar in form to the plate 5 except that at one end bar 13 has a tongue 14 that enters the recess in plate 5, said tongue having a transverse opening to receive the pin 8. This tongue may be formed by a projecting portion of the plate 13 and a small plate 15 integral with or secured to the inner face thereof and which small plate enters opening 16 in the tire seat or rim base and prevents relative lateral motion of the parts when the rim is expanded.

The body of bar 13 is beveled at its edges, as at 13ª, and at one end abuts the arms 9 of plate 5, while at its other end it abuts the ribs 3 and is pivotally connected to a block 17 in the same manner that the plate 5 is connected to block 11.

The rim may consist of two segments, to-wit, segment 4 and another segment which includes the remainder of the rim, in which case when the segment 4 is collapsed inwardly, as in dotted lines Fig. 1, the other segment collapses by an inward bending movement. In the drawings this inward collapsing movement is accentuated by providing the rim with another break and hinge joint directly opposite the collapsing segment. This hinge joint comprises a short plate 17ª attached to one segment, say segment 10, and pivotally connected to a block 18 attached to the other segment 19. This hinge joint is in all particulars like the one joining the plate 5 and segment 10.

The construction described enables the rim to be easily collapsed or expanded and readily adapts it for attachment to the felly. The depth of the hinge members is nowhere any greater than the depth of ribs 3.

What I claim is:

1. A vehicle rim comprising an annulus of channel form in cross section provided with beveled ribs on its inner surface, said annulus having one segmental portion separate and adapted to collapse inwardly, and hinge members connecting said segment to the remainder of the annulus and provided with interfitting tongues and recesses, said hinge members having beveled side portions which at their ends abut said beveled ribs.

2. A vehicle rim comprising an annulus of channel form in cross section provided with beveled ribs on its inner surface, said annulus having one segmental portion separate and adapted to collapse inwardly, a plate attached to the inner surface of said collapsing segment and having beveled side portions which at one end abut the beveled ribs of the adjoining segment and are hinged to said segment, and a toggle bar hinged to the other end of said plate and at its opposite end abutting the beveled ribs of the adjoining segment and hinged to said segment, said bar also having beveled side portions.

In testimony whereof I affix my signature.

CHARLES B. KEENUM.